US007653421B2

(12) United States Patent
Suzuki et al.

(10) Patent No.: US 7,653,421 B2
(45) Date of Patent: Jan. 26, 2010

(54) PORTABLE WIRELESS APPARATUS

(75) Inventors: Hiromichi Suzuki, Hamura (JP); Hiroyuki Hotta, Oume (JP); Takashi Amano, Souka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 539 days.

(21) Appl. No.: 11/657,756

(22) Filed: Jan. 25, 2007

(65) Prior Publication Data

US 2008/0081657 A1 Apr. 3, 2008

(30) Foreign Application Priority Data

Sep. 28, 2006 (JP) ........................... P2006-265555

(51) Int. Cl.
*H04M 1/00* (2006.01)
*H04B 7/00* (2006.01)

(52) U.S. Cl. .............. 455/575.3; 343/702; 343/700 MS

(58) Field of Classification Search ................. 455/101, 455/272, 575.3; 373/702, 700 MS
See application file for complete search history.

(56) References Cited

U.S. PATENT DOCUMENTS 7,554,497 B2 * 6/2009 Ohba et al. ................. 343/702
2005/0143151 A1 * 6/2005 Ito et al. .................. 455/575.3

FOREIGN PATENT DOCUMENTS

JP 3112464 B2 9/2000
JP 2002-027860 A 1/2002

* cited by examiner

*Primary Examiner*—Lee Nguyen
(74) *Attorney, Agent, or Firm*—Frishauf, Holtz, Goodman & Chick, P.C.

(57) ABSTRACT

According to an aspect of the invention, a portable wireless apparatus comprises a first housing and a second housing. The first housing comprises a first board having a first feeding portion; and a first antenna element connected to the first feeding portion and provided on a side of a first surface of the first board. The second housing foldably connected to the first housing comprises a second board having a surface opposite to the first surface of the first board when the second hosing is unfolded with respect to the first housing. The second board comprises a second feeding portion. A second antenna element is connected to the second feeding portion and provided on a side of the surface of the second board.

20 Claims, 8 Drawing Sheets

PORTABLE WIRELESS APPARATUS

CROSS-REFERENCE TO RELATED APPLICATIONS

This application is based on and claims the benefit of priority from the prior Japanese Patent Application No. 2006-265555, filed on Sep. 28, 2006; the entire contents of which are incorporated herein by reference.

BACKGROUND

1. Technical Field

The present invention relates to a portable wireless apparatus and, more particularly, to a portable wireless apparatus where at least two housings are foldably connected to each other.

2. Description of Related Art

Portable wireless apparatus, such as a portable telephone, have employed an antenna diversity technique that use a plurality of antennas and that selectively or synthetically enhances the quality of signals sent therefrom and received thereat. A portable wireless apparatus has hitherto been known, which performs antenna diversity using what is called a whip antenna externally extended from a housing thereof, and also using a built-in antenna, for example, an inverted-F antenna incorporated in the housing thereof. Recently, another portable wireless apparatus has been known, which effects antenna diversity using a plurality of antennas incorporated in a housing thereof (see, for example, Japanese Patent No. 3,112,464 (Pages 1 to 4 and FIG. 3 or JP-A-2002-027860 (Pages 2 and 3 and FIG. 3)).

According to a technique disclosed in Japanese Patent No. 3112464, there have been strong demands for not only the miniaturization of the built-in type antenna of the portable wireless apparatus but that of a non-built-in type antenna thereof. Thus, the portable wireless apparatus is often configured so that a high frequency current distributing in a grounding circuit provided on a board or distributing on a conductive part of a housing is utilized, rather than a high frequency current distributing on an antenna element itself when excited, as a main radiation source. In such a case, even when diversity is effected using a plurality of antennas, it is difficult to fully obtain advantages of the diversity in an occasion where the grounding circuit on the board or the conductive part of the housing, on which the high frequency current distributes, is shared by the antennas.

According to the above-mentioned related art, diversity is achieved by using a first antenna and a second antenna which are respectively provided two housings turnably connected to each other. A main radiation source of radiowaves (the conductive part of one of the housings or the grounding circuit on one of the built-in boards), which is used when the first antenna is excited, is separated from a main radiation source of radio waves (the conductive part of the other housing or the grounding circuit on the other built-inboard), which is used when the second antenna is excited. The correlation in radiation characteristics between the first antenna and the second the antenna is weakened, so that advantages of antenna diversity can be obtained.

According to technique disclosed in JP-A-2002-027860, in a portable wireless apparatus performing antenna diversity using a main antenna and an auxiliary antenna, a linear antenna extending perpendicularly to a board surface is folded to be parallel with the longitudinal direction of the board and is formed as the auxiliary antenna. Thus, the auxiliary antenna is formed into an inverted-L shape so that the auxiliary antenna can compensate the degradation in sensitivity of the main antenna due to change in orientation or posture thereof.

SUMMARY

A portable wireless apparatus has been increased along with dissemination thereof. There are models of portable wireless adaptable to a plurality of radio systems. Some radio systems dominantly employ predetermined polarized waves (for example, a wireless local area network (WLAN) employs a vertically-polarized wave). To adapt a portable wireless apparatus capable of effectively performing antenna diversity to such a kind of a radio system, it is necessary to configure an antenna adaptable to the predetermined polarized wave in the technique disclosed in Japanese Patent No. 3112464.

The technique disclosed in technique disclosed in JP-A-2002-027860 implements polarized-wave between the main antenna and the auxiliary antenna and cannot solve such a problem.

According to an aspect of the invention, there is provide a portable wireless apparatus having two housings foldably connected to each other, which implements an antenna diversity effect, and which is adaptable to a predetermined polarized wave.

According to another aspect of the invention, there is provided a portable wireless-apparatus comprising: a first housing comprising; a first board having a first feeding portion; and a first antenna element connected to the first feeding portion and provided on a side of a first surface of the first board; a second housing foldably connected to the first housing, the second hosing comprising; a second board having a surface opposite to the first surface of the first board when the second hosing is unfolded with respect to the first housing, the second board comprising a second feeding portion; a second antenna element connected to the second feeding portion and provided on a side of the surface of the second board, wherein a first radiation electromagnetic field can be generated by high frequency currents respectively distributing in the first antenna element and the first board when the first antenna element is excited, and wherein the second radiation electromagnetic field can be generated by high frequency currents respectively distributing the second antenna element and the second board when the second antenna element is excited, and wherein the first radiation electromagnetic field and the second radiation electromagnetic field are made to correspond to same linearly polarized electromagnetic wave when the second housing is unfolded with respect to the first housing.

DESCRIPTION OF THE EMBODIMENTS

Hereinafter, embodiments of the invention are described with reference to the accompanying drawings.

First Embodiment

Figure 1:
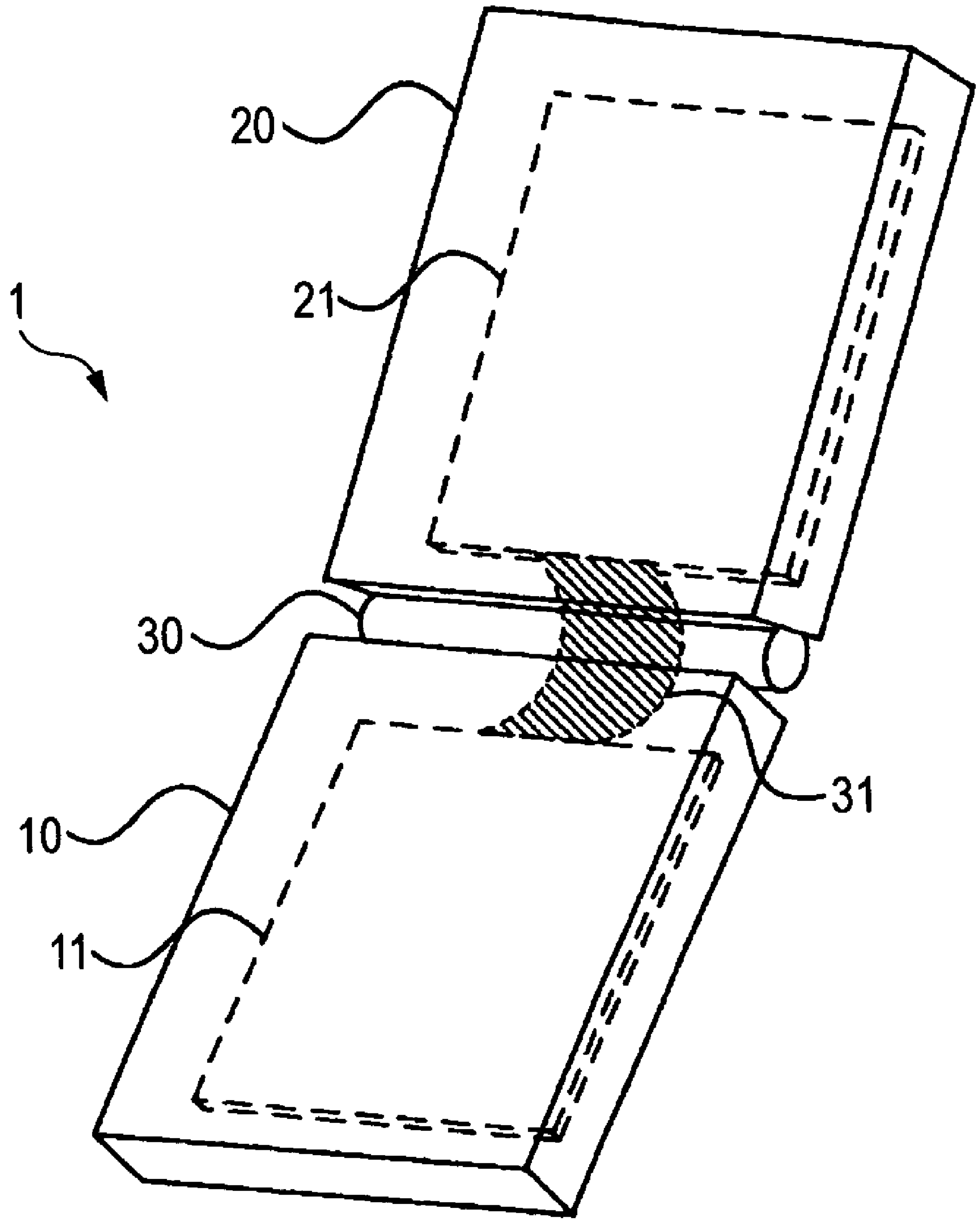
FIG. 1 is an exemplary diagram illustrating the configuration of a portable wireless apparatus according to a first embodiment of the invention.

A first embodiment of the invention is described below by referring to FIGS. 1 to 5. FIG. 1 is a diagram illustrating the configuration of a portable wireless apparatus 1 according to the first embodiment of the invention. The portable wireless apparatus 1 includes a first housing 10 and a second housing 20. The second housing 20 is openably/closably connected to the first housing 10 through a connection portion 30. FIG. 1 illustrates a state in which the second housing 20 is opened with respect to the first housing 10.

The first housing 10 and the second housing 20 respectively incorporate a first board 11 and a second board 21, which are represented by dashed lines. The first board 11 and the second board 21 are connected by, for example, a connection member 31 that is constituted by, for example, a flexible substrate, and that is provided through a connection portion 30. The connection member 31 connects one edge side, which is closest to the second housing 20 among a plurality of edge sides of the first board 11, to one edge side, which is closest to the first housing 10 among a plurality of edge sides of the second board 21. The connection member 31 may has a length of $$\left(\frac{1}{4}+n\right)\cdot\lambda$$

with respect to a direction orthogonal to the one edge side of the first board 11, wheres λ is a wavelength of the high frequency currents, and n is an positive integer. The connection member 31 may be axissymmetricaly arranged with respect to a center between the one edge side of the first board 11 and the edge side of the second board 21.

For example, a group of operation keys (not shown) serving as an operating portion are arranged on a surface of the first housing 10 at the upper side (for convenience of description, hereunder referred to as a front side) of paper on which FIG. 1 is drawn. A transmitter (not shown) is attached in the vicinity of an end portion of the front side surface of the first housing 10, which is a further end portion of this surface from the second housing 20. Also, a display portion (not shown) including, for example, a liquid crystal device is provided on the front side surface of the second housing 20. A receiver (not shown) is attached in the vicinity of an end portion of the front side surface of the second housing 20, which is a further end portion from the first housing 10. FIG. 1 illustrates a state in which the portable wireless apparatus is held by hand so that the second housing 20 is placed above the first housing 10 (that is, both the surfaces, to which the transmitter (not shown) and the receiver (not shown) are attached, are obliquely upwardly directed.

Figure 2:
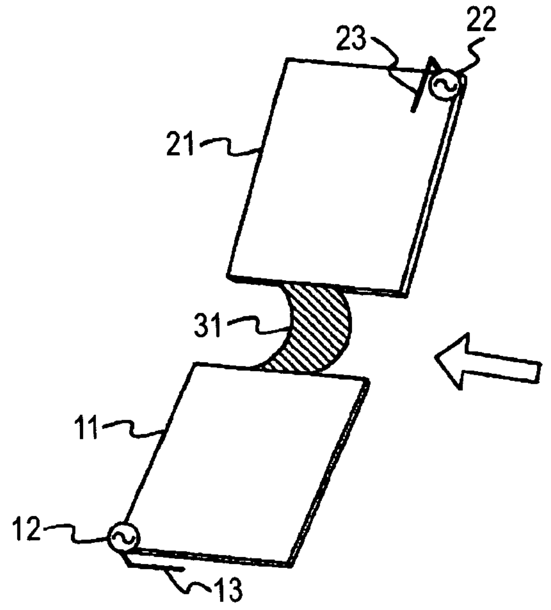
FIG. 2 is an exemplary first diagram illustrating an arrangement of a built-in antenna of the portable wireless apparatus according to the first embodiment.

FIG. 2 is a first diagram illustrating an arrangement of a built-in antenna of the portable wireless apparatus 1. The first board 11, the second board 21, and the connection member 31 are the same as those shown in FIG. 1, in which the apparatus 1 is taken from the same direction as that in which FIG. 2 is taken. FIG. 2 illustrates a state which is similar to the state shown in FIG. 1, in which the portable wireless apparatus 1 is held by hand so that the second housing 20 (not shown in FIG. 2) is opened with respect to the first housing 10 (not shown in FIG. 2). What is called a "block arrow" is drawn at a right-side part of FIG. 2 to describe the portable wireless apparatus 1 by referring to FIG. 3.

For convenience of description, an upper edge side, a lower edge side, a left edge side, and a right edge side of the first board 11, as viewed in FIG. 2, are referred to simply as an upper side, a lower side, a left side and a right side of the first board 11, respectively. Also, an upper edge side, a lower edge side, a left edge side, and a right edge side of the second board 21, as viewed in FIG. 2, are referred to simply as an upper side, a lower side, a left side and a right side of the second board 21, respectively. The nomenclature of the upper side, the lower side, the right side, and the left side of each of the first board 11 and the second board 21 is common to the following embodiments.

Figure 11:
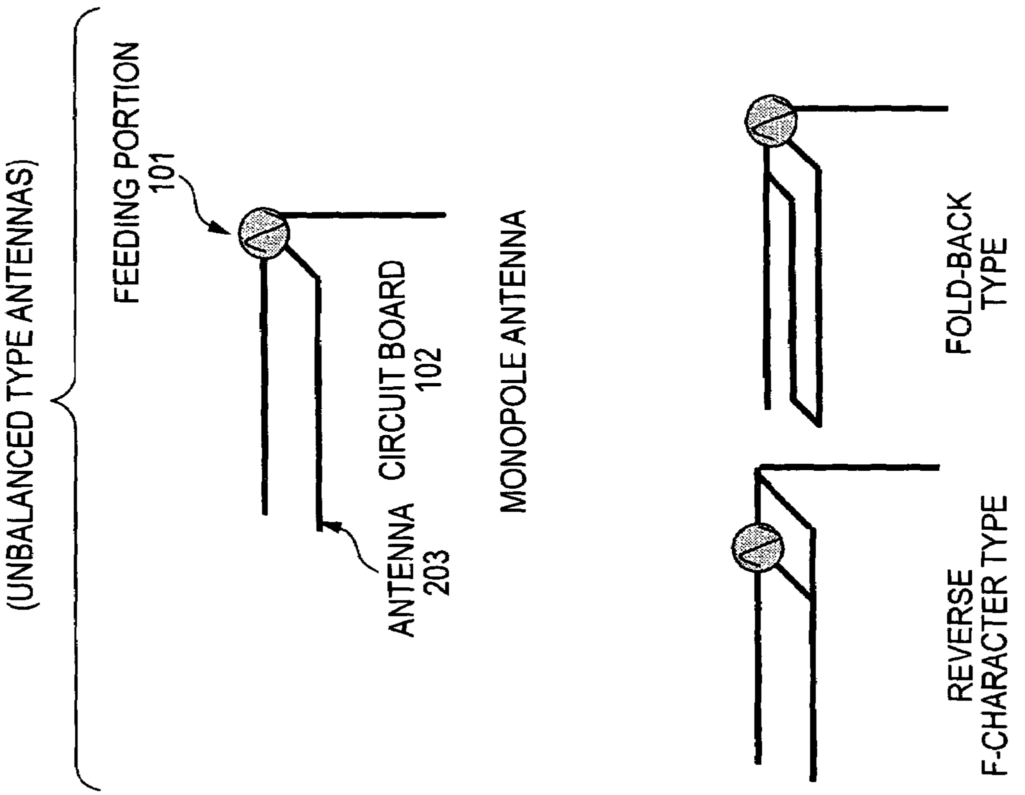
FIG. 11 shows unbalanced type antennas according to the embodiments, such as monopole antenna, folded monopole antenna, and inverted F-type antenna.
Figure 10:
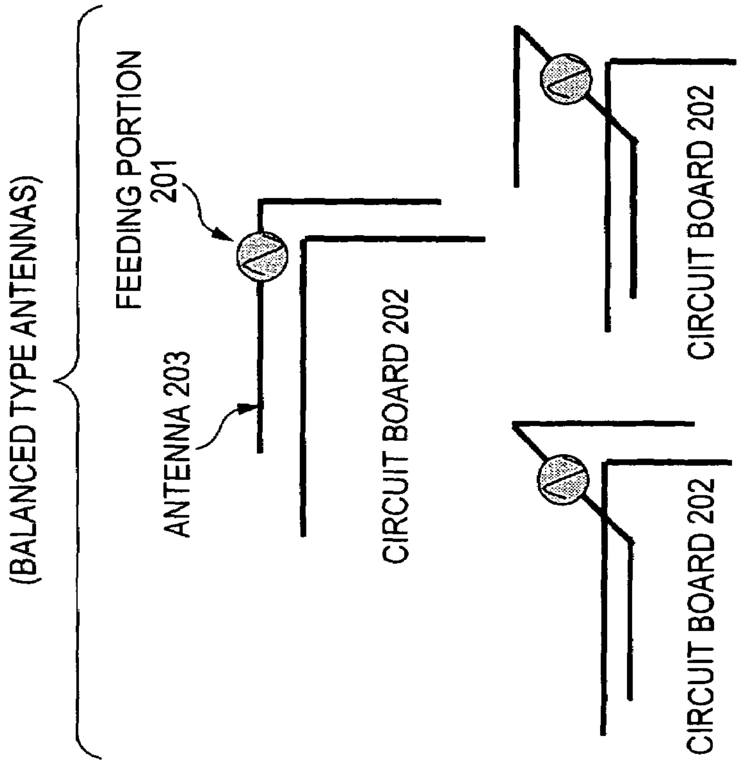
FIG. 10 shows examples of balanced type antennas.

A first feeding portion 12 is provided in the vicinity of the lower side of the first board 11. A first antenna element 13 is connected to the first feeding portion 12. The first antenna element 13 is an unbalanced type antenna, for example, an open-tip monopole type antenna. Hereinafter, the unbalanced type antenna is, for example, an antenna in which current can flow into a circuit board connected to the antenna. FIG. 11 shows unbalanced type antennas according to embodiments, such as monopole antenna, fold-back type monopole antenna, and reverse F-character type monopole antenna. Each unbalanced type has an antenna 103, a feeding portion 101, a circuit board 102 connected to the antenna 103 via the feed portion 101. FIG. 10 shows examples of balanced type antennas. Each antenna 203 is connected to circuit board 202 via a balanced-unbalanced type exchanger, such as a chip balun (not shown). Each antenna 203 is electrically fed by the balanced-unbalanced type exchanger. The first antenna element 13 is provided on a surface of the first board 11 at the lower side (for convenience of description, hereunder referred to as a rear side) of paper on which FIG. 1 or FIG. 2 is drawn.

A second feeding portion 22 is provided in the vicinity of the upper side of the second board 21. A second antenna element 23 is connected to the second feeding portion 22. The second antenna element 23 is an unbalanced antenna, for example, an open-tip monopole antenna. The second antenna element 23 is provided on the front side surface of the second board 21, as viewed in FIG. 1 or 2.

Figure 3:
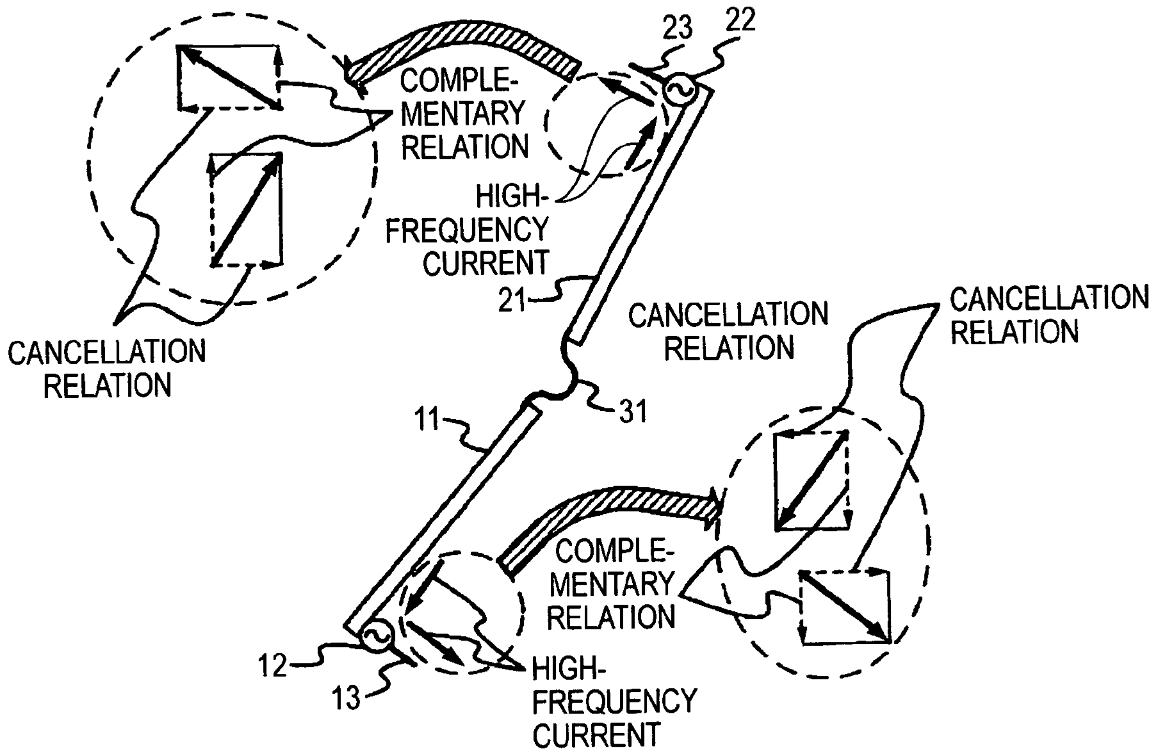
FIG. 3 is an exemplary diagram illustrating a high-frequency current distribution in the case of the antenna arrangement shown in FIG. 2 in the first embodiment.

FIG. 3 is a diagram illustrating a high-frequency current distribution obtained when the first antenna element 13 or the second antenna element 23, which is provided as shown in FIG. 2, is excited. The first board 11, the second board 21, and the connection member 31 are shown by being taken from the direction of the block arrow shown at the right part of FIG. 2. FIG. 3 illustrates a state which is similar to the state shown in FIG. 1 or 2, in which the portable wireless apparatus 1 is held by hand so that the second housing 20 (not shown in FIG. 3) is opened with respect to the first housing 10 (not shown in FIG. 3).

As shown in FIG. 3, in a case where the first antenna element 13 is excited, a high-frequency current distributes in each of (the grounding circuit of) the first board 11 and the first antenna element 13, which sandwich the first feeding portion 12 shown in FIG. 3. In a case where the high-frequency current distributes in a direction, in which the high-frequency current flows into the first feeding portion 12 on the first board 11, as shown in, for example, FIG. 3, the high-frequency current distributes in the first antenna element 13 in a direction, in which the high-frequency current flows out from the first feeding portion 12 (incidentally, the direction of the current distribution shown in FIG. 3 and the description thereof have meanings in relative comparisons and do not have meanings in absolute comparisons (this is the same with the high-frequency current distribution described in each of the following drawings and the descriptions of the embodiments)).

As indicated in a lower dashed-line oval shown in FIG. 3, the high-frequency current can be analyzed by being decomposed into a longitudinal vector component and a transverse vector component. The high-frequency current distributing in the first board 11 is decomposed into a horizontal vector component, which is directed from right to left as viewed in FIG. 3, and a vertical vector component that is directed from top to bottom as viewed in FIG. 3. The high-frequency current distributing in the first antenna element 13 is decomposed into a horizontal vector component, which is directed from right to left as viewed in FIG. 3, and a vertical vector component that is directed from top to bottom as viewed in FIG. 3.

Therefore, the horizontal vector component of the high-frequency current distributing in the first board 11 cancels out that of the high-frequency current distributing in the first antenna element 13. The vertical vector component of the high-frequency current distributing in the first board 11 is complementary to that of the high-frequency current distributing in the first antenna element 13. Consequently, a radiation electromagnetic field generated from the high-frequency current distributing in the first board 11 and that distributing in the first antenna element 13 corresponds to a vertical polarized wave.

In a case where the second antenna element 23 shown in FIG. 3 is excited, the high-frequency current distributes in each of the second board 21 and the second antenna element 23, which sandwich the second feeding portion shown in FIG. 3. Consequently, as indicated by an upper dashed-line oval shown in FIG. 3, the high-frequency current can be analyzed by being decomposed into a longitudinal vector component and a transverse vector component.

According to study performed similarly to the case where the first antenna element 13 is excited, the horizontal vector component of the high-frequency current distributing in the second board 21 cancels out that of the high-frequency current distributing in the second antenna element 23. The vertical vector component of the high-frequency current distributing in the first board 21 is complementary to that of the high-frequency current distributing in the first antenna element 23. Consequently, a radiation electromagnetic field generated from the high-frequency current distributing in the second board 11 and that distributing in the second antenna element 13 corresponds to a vertical polarized wave, similarly to the case where the first antenna element 13 is excited.

Figure 4:
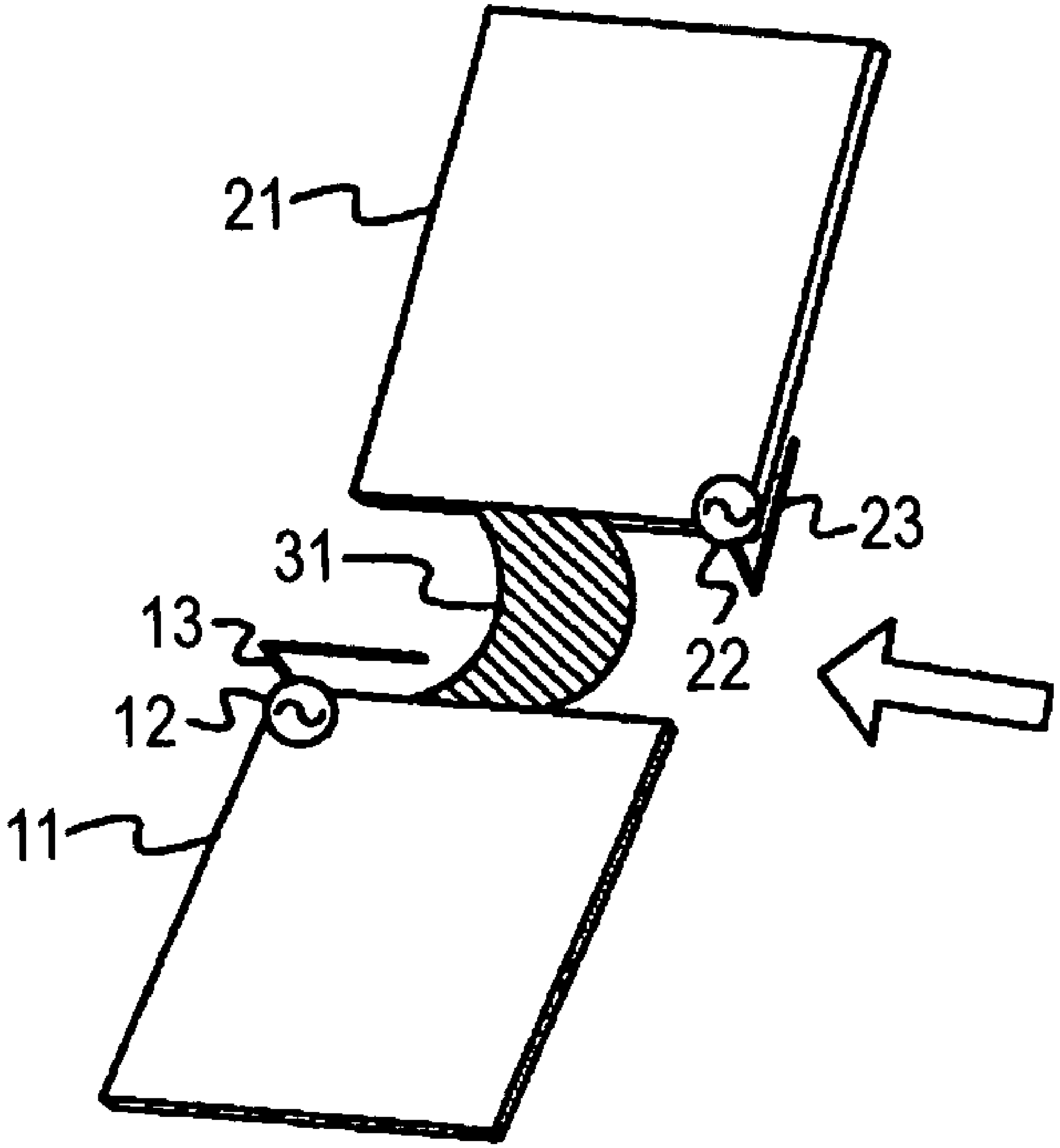
FIG. 4 is an exemplary second diagram illustrating an arrangement of a built-in antenna of the portable wireless apparatus according to the first embodiment.

FIG. 4 is a second diagram illustrating an arrangement of a built-in antenna of the portable wireless apparatus 1 according to the portable wireless apparatus 1. The first board 11, the second board 21, and the connection member 31 are the same as those shown in FIG. 1 or 2, in which the apparatus 1 is taken from the same direction as that in which FIG. 4 is taken. FIG. 4 illustrates a state which is similar to the state shown in FIG. 1, in which the portable wireless apparatus 1 is held by hand so that the second housing 20 (not shown in FIG. 4) is opened with respect to the first housing 10 (not shown in FIG. 4). A "block arrow" is drawn at a right-side part of FIG. 4 to describe the portable wireless apparatus 1 by referring to FIG. 5. It is assumed that the first feeding portion 12, the second feeding portion 22, the first antenna element 13, and the second antenna element 23 are the same as those described by referring to FIG. 2, except the placement positions thereof.

As shown in FIG. 4, the first feeding portion 12 is provided in the vicinity of the upper side of the first board 11. The first antenna element 13 connected to the first feeding portion 12 is provided on the front side surface of the first board 11, which is shown in FIG. 1 or 4.

As shown in FIG. 4, the second feeding portion 21 is provided in the vicinity of the lower side of the second board 21. The second antenna element 23 connected to the second feeding portion 22 is provided on the rear side surface of the second board 21, which is shown in FIG. 1 or 4.

Figure 5:
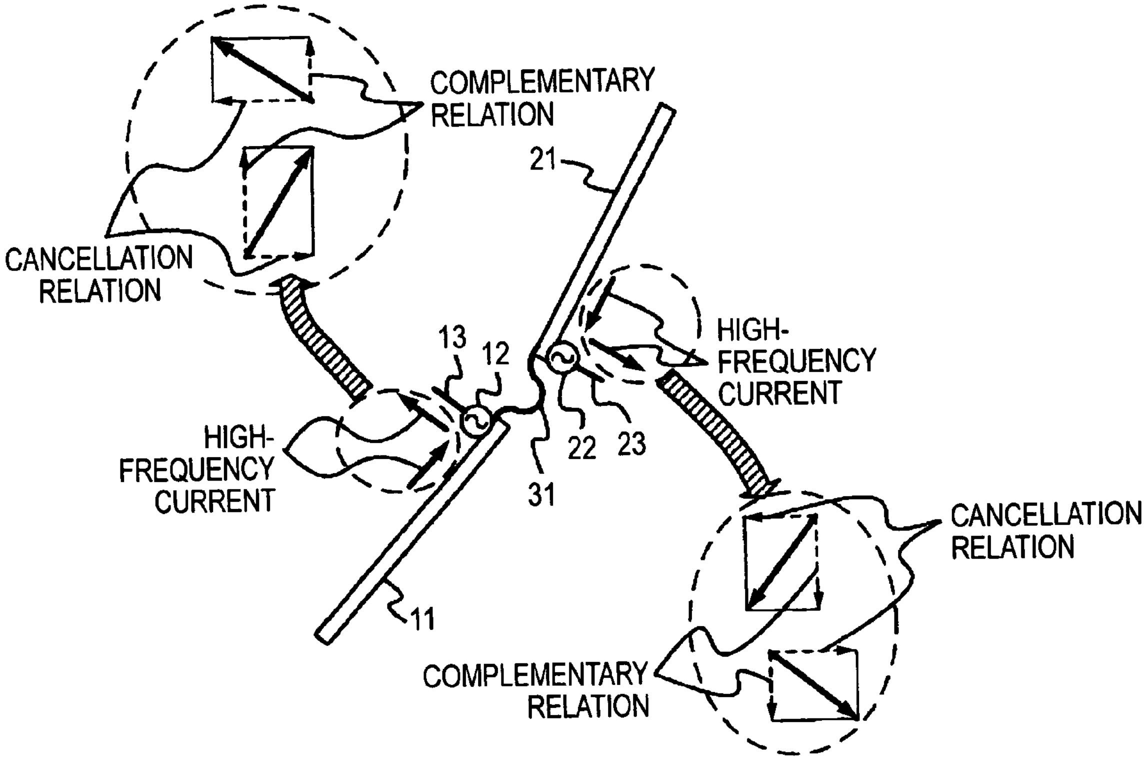
FIG. 5 is an exemplary diagram illustrating a high-frequency current distribution in the case of the antenna arrangement shown in FIG. 4 in the first embodiment.

FIG. 5 is a diagram illustrating a high-frequency current distribution obtained when the first antenna element 13 or the second antenna element 23 is excited, as shown in FIG. 4. The first board 11, the second board 21, and the connection member 31 are the same as those shown in FIG. 4, in which the apparatus 1 is taken from the direction of the "block arrow" shown in the right side part of FIG. 4. FIG. 5 illustrates a state which is similar to the state shown in FIG. 1 or 4, in which the portable wireless apparatus 1 is held by hand so that the second housing 20 (not shown in FIG. 5) is opened with respect to the first housing 10 (not shown in FIG. 5).

Similarly to the description made by referring to FIG. 3, as shown in FIG. 5, the horizontal vector component of the high-frequency current distributing in the first board 11 cancels out that of the high-frequency current distributing in the first antenna element 13. The vertical vector component of the high-frequency current distributing in the first board 11 is complementary to that of the high-frequency current distributing in the first antenna element 13. Consequently, radiation electromagnetic fields generated from these high-frequency currents correspond to a vertical polarized wave.

The descriptions made by referring to FIGS. 3 and 5 can be generalized as follows. That is, in a state in which the portable wireless apparatus 1 is held by hand, a high-frequency current distributes in a portion lower than the first feeding portion 12 provided on the first board 11, because of the placement of the first feeding portion 12 closer to the second housing 20, or due to the shape of the grounding circuit provided on the first board 11. In this case, the portable wireless apparatus 1 can be adapted by attaching the first antenna element 13 to the front side of the first board 11 so that the radiation electromagnetic field generated from the high-frequency current corresponds to a vertically-polarized wave. In such a state, a high-frequency current distributes in a portion higher than the first feeding portion 12 provided on the first board 11, because of the placement of the first feeding portion 12 further from the second housing 20, or due to the shape of the grounding circuit provided on the first board. In this case, the portable wireless apparatus 1 can be adapted by attaching the first antenna element 13 to the rear side of the first board 11 so that the radiation electromagnetic field generated from the high-frequency current corresponds to a vertically-polarized wave.

Also, in such a state, a high-frequency current distributes in a portion higher than the second feeding portion 22 provided on the second board 21, because of the placement of the second feeding portion 22 closer to the first housing 10, or due to the shape of the grounding circuit provided on the second board 21. In this case, the portable wireless apparatus 1 can be adapted by attaching the second antenna element 23 to the rear side of the second board 21 so that the radiation electromagnetic field generated from the high-frequency current corresponds to a vertically-polarized wave. In such a state, a high-frequency current distributes in a portion lower than the second feeding portion 22 provided on the second board 21, because of the placement of the second feeding portion 22 further from the first housing 10, or due to the shape of the grounding circuit provided on the second board 21. In this case, the portable wireless apparatus 1 can be adapted by attaching the second antenna element 23 to the front side of the second board 21 so that the radiation electromagnetic field generated from the high-frequency current corresponds to a vertically-polarized wave.

The above generalized description can be paraphrased as follows. In a state in which the portable wireless apparatus 1 is held by hand, a high-frequency current distributes in a portion lower than the first feeding portion 12 provided on the first board 11, because of the placement of the first feeding portion 12 closer to the second housing 20, or due to the shape of the grounding circuit provided on the first board 11. In this case, the portable wireless apparatus 1 can be adapted by attaching the first antenna element 13 to the rear side of the first board 11 so that the radiation electromagnetic field generated from the high-frequency current corresponds to a horizontally-polarized wave. In such a state, a high-frequency current distributes in a portion higher than the first feeding portion 12 provided on the first board 11, because of the placement of the first feeding portion 12 further from the second housing 20, or due to the shape of the grounding circuit provided on the first board 11. In this case, the portable wireless apparatus 1 can be adapted by attaching the first antenna element 13 to the front side of the first board 11 so that the radiation electromagnetic field generated from the high-frequency current corresponds to a horizontally-polarized wave.

Also, in such a state, a high-frequency current distributes in a portion higher than the second feeding portion 22 provided on the second board 21, because of the placement of the second feeding portion 22 closer to the first housing 10, or due to the shape of the grounding circuit provided on the second board 21. In this case, the portable wireless apparatus 1 can be adapted by attaching the second antenna element 23 to the front side of the second board 21 so that the radiation electromagnetic field generated from the high-frequency current corresponds to a horizontally-polarized wave. In such a state, a high-frequency current distributes in a portion lower than the second feeding portion 22 provided on the second board 21, because of the placement of the second feeding portion 22 further from the first housing 10, or due to the shape of the grounding circuit provided on the second board 21. In this case, the portable wireless apparatus 1 can be adapted by attaching the second antenna element 23 to the rear side of the second board 21 so that the radiation electromagnetic field generated from the high-frequency current corresponds to a horizontally-polarized wave.

Although it has been described in the description of the first embodiment that the first housing 10 and the second housing 20 can be folded through the connection portion 30 shown in FIG. 1, the configuration of these housings is not limited thereto. These housings may be configured to be of, for example, the turnover type adapted so that the connection portion 30 has a biaxial hinge (that is, the first housing 10 and the second housing 20 can be folded by changing the opposed faces of the housings 10 and 20). Alternatively, these housings may be configured to be of, for example, the slide type (that is, the first housing 10 and the second housing 20 can be folded by causing the second housing 20 to slide with respect to the first housing 10).

According to the first embodiment of the invention, a portable wireless apparatus, in which two housings respectively incorporating boards are connected to each other, can be adapted according to the orientation, in which the antenna elements are respectively attached to the boards, and to the manner of the distribution of the high-frequency current on the board so that the radiation electromagnetic fields respectively generated by exciting the antenna elements provided on the boards correspond to the same linearly polarized wave.

Second Embodiment

Hereinafter, a second embodiment of the invention is described with reference to FIGS. 6 to 9. A portable wireless apparatus according to the second embodiment of the invention is the same as that according to the first embodiment except the placement positions of the feeding points and the antenna elements. Thus, each of the components of the portable wireless apparatus is refereed to as the same name as that of a corresponding component. Also, the drawings referred to in the description of the first embodiment are also referred to.

Figure 6:
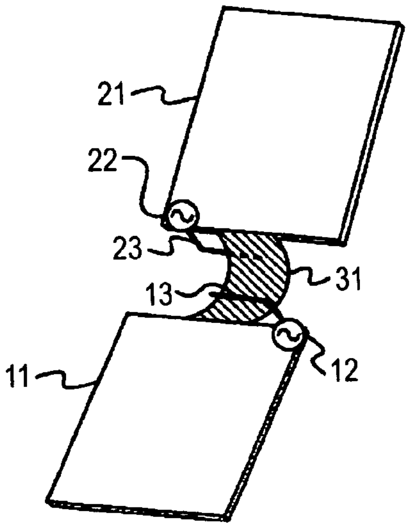
FIG. 6 is an exemplary diagram illustrating an arrangement of a built-in antenna of a portable wireless apparatus according to a second embodiment.

FIG. 6 is a diagram illustrating an arrangement of a built-in antenna of a portable wireless apparatus according to the second embodiment of the invention. FIG. 6 is the same as FIG. 2 except the placement positions the placement positions of the second feeding portion 22 and the second antenna element 23. The drawing of the first housing 10 incorporating the first board 11, the second housing 20 incorporating the second board 21, and the connection portion 30 is omitted in FIG. 6. The nomenclature of the edge sides of the first board 11 and the second board 21 is common to the first embodiment.

The first feeding portion 12 is provided in the vicinity of a corner portion of the first board 11, which is closer to the second housing 20 (not shown in FIG. 6). The first antenna element 13 is provided on the front side surface of the first board 11, as viewed in FIG. 6. The second feeding portion 22 is provided in the vicinity of a corner portion of the second board 2, which is close to the first housing (not shown in FIG. 6) and is further from the first feeding portion 12. The second antenna element 23 is provided on the rear side surface of the second board 21, as viewed in FIG. 6. This is a mode of the configuration of the portable wireless apparatus 1, which corresponds to a vertically polarized wave and has been described in the foregoing description of the first embodiment.

Figure 7:
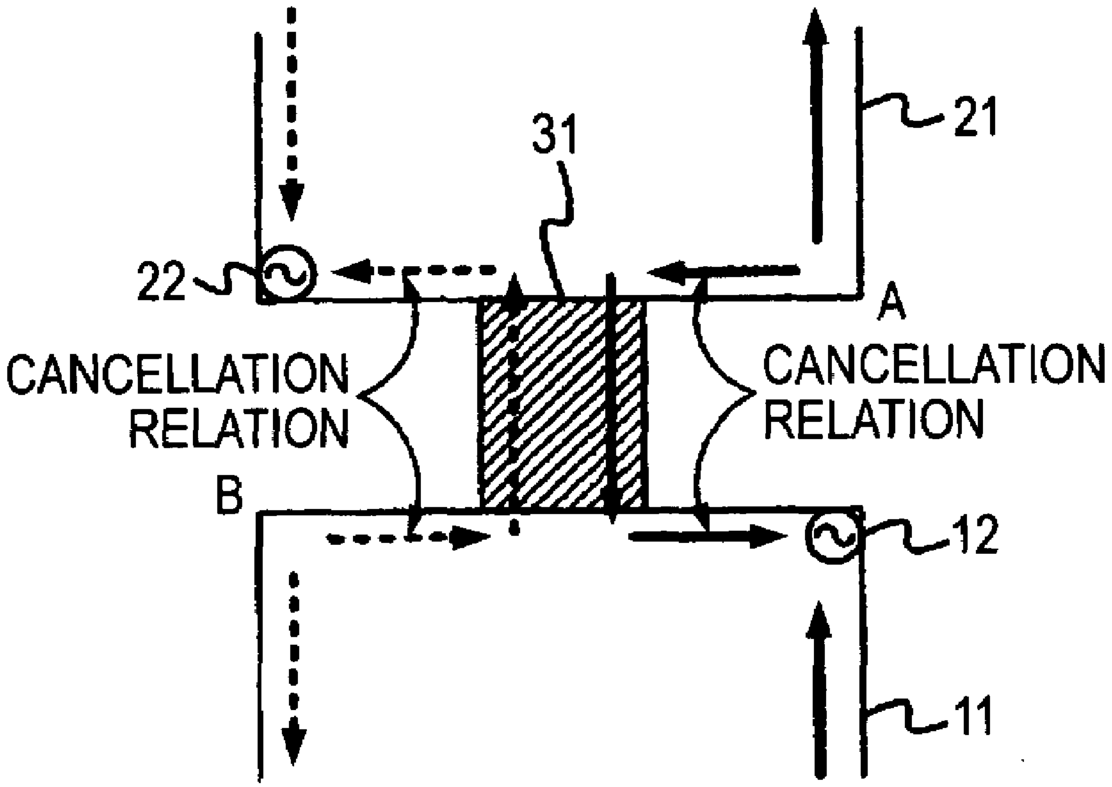
FIG. 7 is an exemplary diagram illustrating a high-frequency current distribution in the case of the antenna arrangement shown in FIG. 6 in the second embodiment.

FIG. 7 is a diagram illustrating high-frequency current distributions in the first board 11, the second board 21, and the connection member 31, which are caused when the first antenna element 13 and the second antenna element 23 provided, as shown in FIG. 6, are excited. FIG. 7 shows a part of each of the first board 11 and the second board 21. The drawing of the first antenna element 12 and the second antenna element 22 is omitted herein.

Each of the first board 11 and the second board 21 has a grounding circuit at least along each edge side thereof. The grounding circuit provided on the first board 11 is connected to that provided on the second board 21 through the connection member 31.

As shown in FIG. 7, a corner portion A of the second board 21 is opposed to the first feeding portion 12. Also, a corner portion B of the first board 11 is opposed to the second feeding portion 22. The line length of the grounding circuit extending from the first feeding portion 12 along the upper side of the first board 11, through the connection member 31, and along the lower side of the second board 21 to the corner portion A is assumed to be equivalent to a quarter wavelength of radio waves having a frequency used in the portable wireless apparatus 1. Similarly, the line length of the grounding circuit extending from the second feeding portion 22 along the lower side of the first board 21, through the connection member 31, and along the upper side of the first board 11 to the corner portion B is assumed to be equivalent to a quarter wavelength of radio waves having a frequency used in the portable wireless apparatus 1.

In a case where the first antenna element 13 (not shown in FIG. 7) is excited, a high frequency current distributes along the grounding circuit having a line length equivalent to the quarter wavelength, for example, in a direction from the corner portion A to the feeding point 12. Also, a high frequency current distributes along the right side of the first board 11 toward the first feeding portion 12. Additionally, a high frequency current distributes along the right side of the second board 21 from the corner portion A to a portion placed at an upper part of the FIG. 7.

Thus, as shown in FIG. 7, a component of the high frequency current distributing along the upper side of the first board 11 cancels a component of the high frequency current distributing along the lower side of the second board 21, because the apparent orientations of these components are opposite to each other. Meanwhile, the component of a high frequency current distributing substantially in parallel to the right side of the first board 11 does not cancel that of a high frequency current distributing substantially in parallel to the right side of the second board 21. These components are predominant. A radiation electromagnetic field pattern has null points arranged in an up-down direction in FIG. 7. The radiation electromagnetic field pattern is almost non-directional in a plane perpendicular to paper on which FIG. 7 is drawn (incidentally, the pattern is predominant in the rightward direction, as viewed in FIG. 7). In a state in which the portable wireless apparatus is held by hand, a peak of the radiation electromagnetic field pattern is directed in a radio wave arrival direction with high possibility.

Incidentally, as shown in FIG. 6, the first antenna element 13 is provided to extend in a direction which is substantially perpendicular to the right side of the first board 11. Thus, the first antenna element can be set so that a high frequency current distributing in the first antenna element 13 does not cancel a high frequency current distributing along the right side of the first board 11 or the second board 21.

Similarly, a radiation electromagnetic field pattern, which is formed in a case where the second antenna element 23 (not shown in FIG. 7) is excited, has null points arranged in the up-down direction, as viewed in FIG. 7, and is almost non-directional in a plane perpendicular to the paper on which FIG. 7 is drawn (incidentally, the pattern is predominant in the leftward direction, as viewed in FIG. 7). The radiation electromagnetic field pattern, which is formed in a case where the second antenna element 23 is excited, is bilaterally-symmetric with a radiation electromagnetic field pattern, which is formed in a case where the second antenna element 13 is excited, as viewed in FIG. 7. Thus, antenna diversity can effectively be performed by combining the first antenna element 13 with the second antenna element 23, as shown in FIG. 6 or 7.

Incidentally, even in a case where the line length of the grounding circuit provided between the first feeding portion 12 and the corner portion A is not exactly equivalent to the quarter wavelength, the above advantage can be obtained in an occasion where the line length of this grounding circuit is close to the quarter wavelength. This is the same with the line length of the grounding circuit provided between the second feeding portion 22 and the corner portion B. Even in a case where only one of the first feeding portion 12 and the second feeding portion 22 is provided as illustrated in FIG. 7, the advantage due to the radiation electromagnetic field pattern of the right half part or the left half part of FIG. 7 can be obtained.

Figure 8:
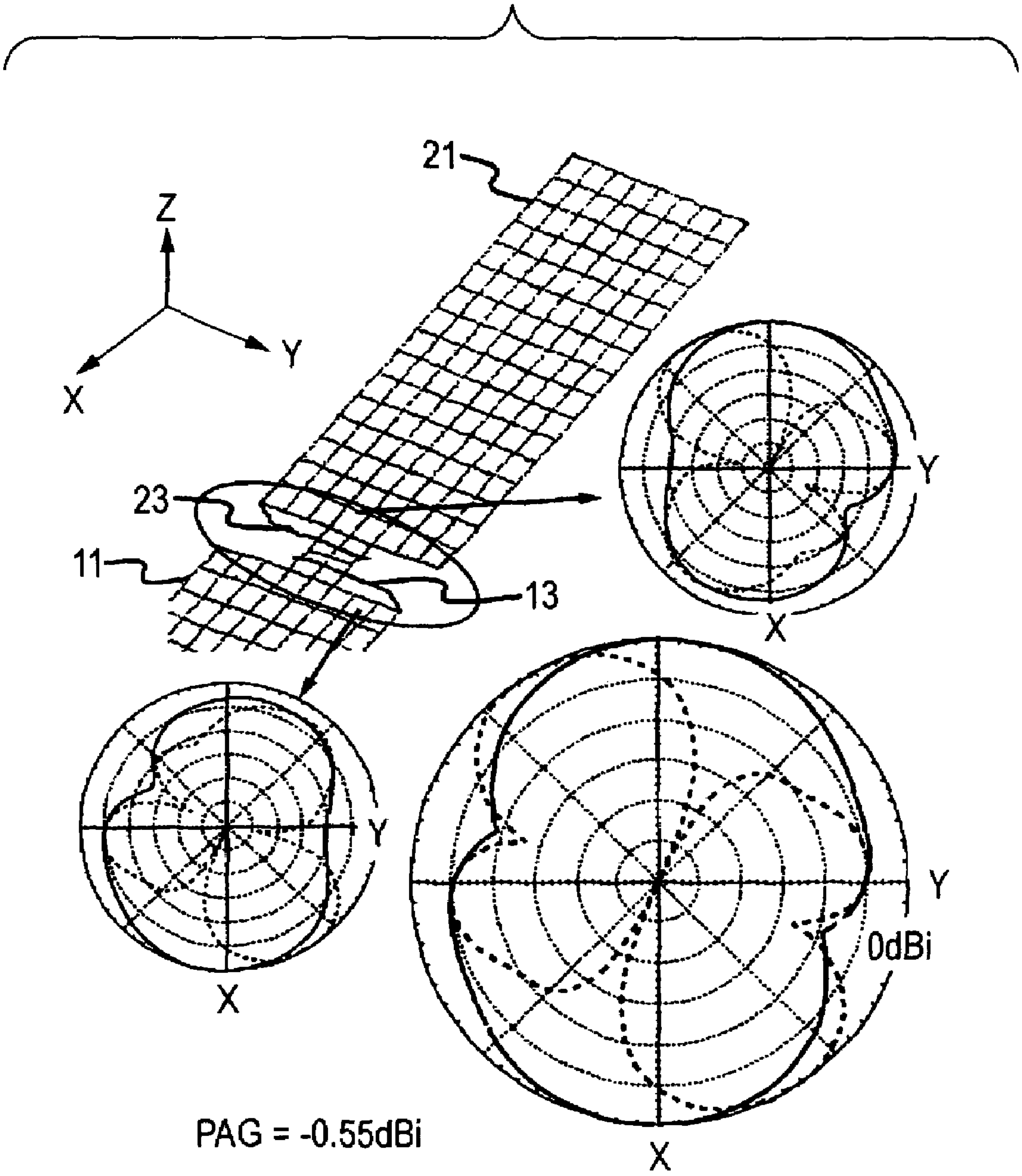
FIG. 8 is an exemplary diagram illustrating a radiation electromagnetic field pattern obtained by simulation according to the antenna arrangement in the second embodiment.

The radiation electromagnetic field pattern obtained by the arrangement of the antenna elements according to the second embodiment is described below with reference to FIG. 8. FIG. 8 is a diagram illustrating an example of the radiation electromagnetic field pattern obtained by simulation. Constituents respectively designated by reference numerals 11, 13, 21, and 23 are the same as those designated by the same reference numerals shown in FIG. 6.

Among conditions set for simulation, the length of the longer side (that is, the left side or the right side) of each of the first board 11 and the second board 21 is 80 mm. The length of the shorter side (that is, the upper side or the lower side) of each of the first board 11 and the second board 21 is 40 mm. The first board 11 and the second board 21 are arranged in the direction of the longer side at an interval of 10 mm in a plane. The frequency of the radio waves used in simulation is 2.5 GHZ. Each of the first antenna element 13 and the second antenna element 23 is an open-tip monopole type antenna having a length equal to the quarter wavelength. In a horizontal plane, a Y-axis is set to extend in a direction parallel to the shorter side of the first board 11 or the second board 21. In the horizontal plane, an X-axis is set to extend in a direction perpendicular to the Y-axis. Also, a Z-axis is set to extend in a vertical direction. A state, in which the portable wireless apparatus 1 is held by hand, is simulated by setting the first board 11 and the second board 21 to be inclined at an angle of 45° to the Z-axis.

Under the above conditions, a radiation electromagnetic field pattern, which is formed in an X-Y plane when the first antenna element 13 is excited, is obtained. The obtained radiation electromagnetic field pattern is indicated in a smaller circle shown in a downwardly leftward part of FIG. 8. Then, a radiation electromagnetic field pattern, which is formed in the X-Y plane when the second antenna element 23 is excited, is obtained. This radiation electromagnetic field pattern is indicated in a smaller circle shown in an upwardly rightward part of FIG. 8. Subsequently, a synthesis pattern is synthesized from the two radiation electromagnetic field patterns obtained as described above. The synthesis pattern is indicated in a larger circle shown in a downwardly rightward part of FIG. 8.

It is assumed to be common to the three circles that the downward direction of each of the circles in FIG. 8 coincides with a positive direction of the X-axis, and that the rightward direction of each of the circles in FIG. 8 coincides with a positive direction of the Y-axis. The outermost one of a plurality of concentric circles corresponds to an antenna gain 0 dB. Then, concentric dotted circles are shown so that the decrement of the radius of the dotted circle is (−5) dB. Solid curves drawn in the outermost ones of the concentric circles represent the radiation electromagnetic field pattern due to the vertically polarized wave. Dashed curves drawn in the outermost ones of the concentric circles represent the radiation electromagnetic field pattern due to the horizontally polarized wave. According to a result of the simulation, which is indicated in the larger circle shown at the downwardly rightward part of FIG. 8, it is found that a synthetic radiation electromagnetic field pattern is obtained, which is almost non-directional in the X-Y plane due to the vertically polarized wave. Additionally, antenna gains in all directions (over 360°) of the vertically polarized wave was averaged, so that (−0.55) dBi was obtained as the value of a pattern average gain (PAG).

Figure 9:
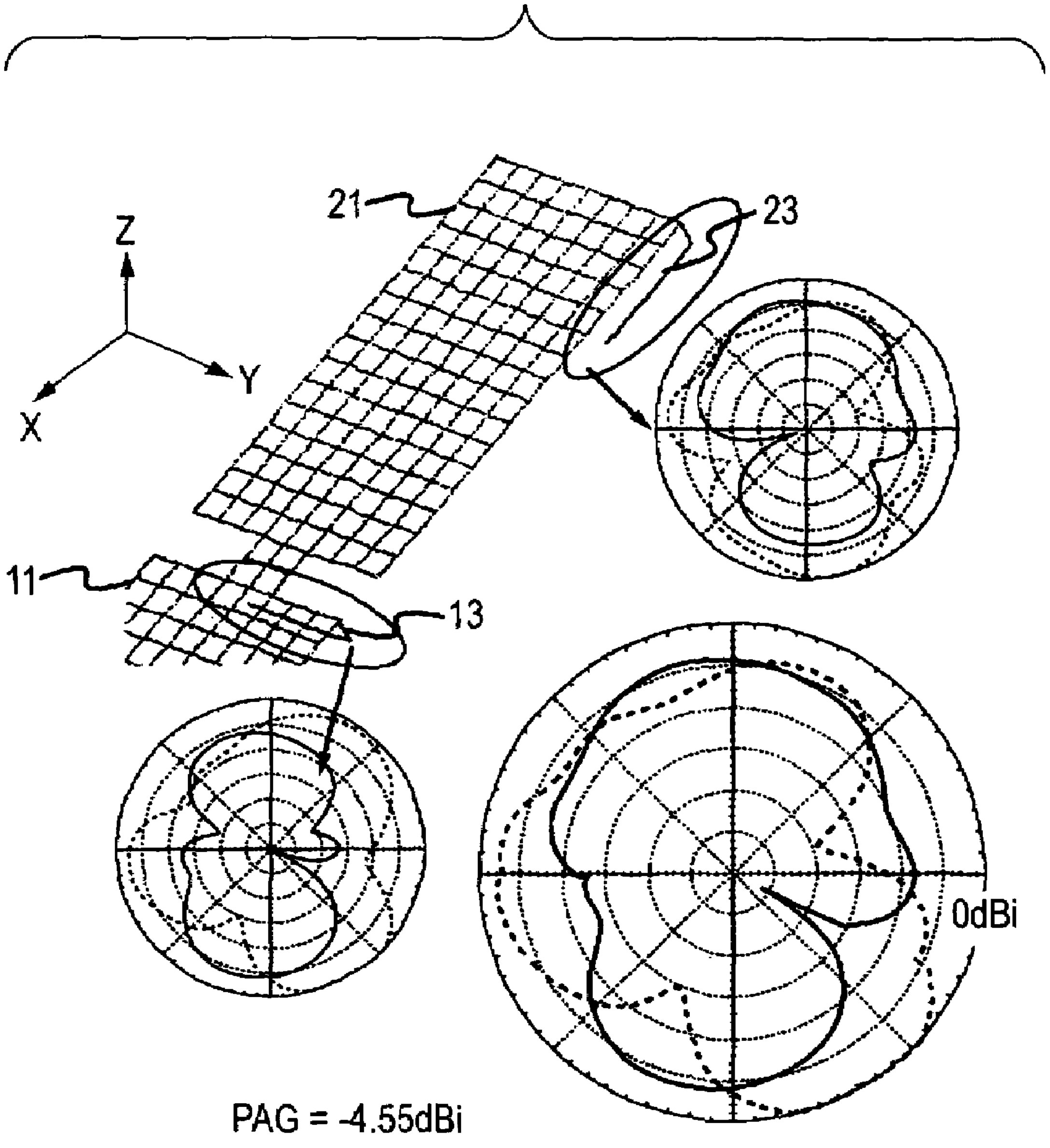
FIG. 9 is an exemplary diagram illustrating a radiation electromagnetic field pattern obtained by simulation according to an antenna arrangement other than the antenna arrangement in the second embodiment.

FIG. 9 is a diagram illustrating an example of a radiation electromagnetic field pattern obtained by simulation according to an antenna arrangement other than the antenna arrangement according to the invention, for comparison with the radiation electromagnetic field pattern shown in FIG. 8. Constituents respectively designated by reference numerals 11, 13, 21, and 23 shown in FIG. 9 are the same as those designated by the same reference numerals shown in FIG. 8. In the arrangement of the antenna elements corresponding to FIG. 9, the first antenna element 13 is provided on the rear side surface of the first board 11. The second antenna element 23 is provided on the rear side surface of the first board 11. Also, for example, for convenience of mechanical mounting of the portable wireless apparatus 1, the first antenna element 13 may be provided in the vicinity of the upper side of the first board 1. The second antenna element 23 may be provided in the vicinity of the upper side of the second substrate 21.

The remaining conditions for simulation (the setting of coordinate axes, the inclination of each of the first board 11 and the second board 21 to the Z-axis, the sizes of the first board 11 and the second board 21, the distance between the first board 11 and the second board 21, and the frequency of the wave) are common to the simulation corresponding to FIG. 8. The meanings of the radiation electromagnetic field patterns shown in the two smaller circles and the larger circle shown in FIG. 8, and the unit of the antenna gain are common to those in the case shown in FIG. 8.

A result of the simulation, which is indicated in the larger circle shown at a downwardly rightward part of FIG. 9, shows that the gain of the synthetic radiation electromagnetic field pattern due to the vertically polarized wave is not almost non-directional in the X-Y plane, because null points are present dominantly in a specific direction, differently from the result of the simulation corresponding to FIG. 8. It was found that the pattern average gain (PAG) in the case of the simulation corresponding to FIG. 9 was (−4.55) dBi and was worse than that in the case of the simulation corresponding to FIG. 8 about 4 dB.

According to the second embodiment of the invention, the radiation electromagnetic field pattern due to a vertically polarized wave in the state, in which the portable wireless apparatus is held by hand, in a horizontal plane is made to be closer to a non-directional one. Thus, favorable transmitting-receiving characteristics can be obtained. Incidentally, the configurations, the shapes, and the arrangement of constituents of the portable wireless apparatus have been described in the foregoing description of the embodiments, for illustrative purposes. Various modifications will become possible without departing from the scope of the invention.

According to the above-embodiments, there is provided a portable wireless apparatus having two housings foldably connected to each other, which implements an antenna diversity effect, and which is adaptable to a predetermined polarized wave.

What is claimed is:

1. A portable wireless apparatus, comprising:

a first housing comprising;

a first board having a first feeding portion;

a first antenna element connected to the first feeding portion and provided on a side of a first surface of the first board;

a second housing foldably connected to the first housing, the second hosing comprising;

a second board having a surface opposite to the first surface of the first board when the second hosing is unfolded with respect to the first housing, the second board comprising a second feeding portion;

a second antenna element connected to the second feeding portion and provided on a side of the surface of the second board, wherein a first radiation electromagnetic field can be generated by high frequency currents respectively distributing in the first antenna element and the first board when the first antenna element is excited, and wherein the second radiation electromagnetic field can be generated by high frequency currents respectively distributing the second antenna element and the second board when the second antenna element is excited, and wherein the first radiation electromagnetic field and the second radiation electromagnetic field are made to correspond to same linearly polarized electromagnetic wave when the second housing is unfolded with respect to the first housing.

2. The portable wireless apparatus according to claim 1, wherein the first antenna element is an antenna in which current can flow into the first board connected to the first antenna element.

3. The portable wireless apparatus according to claim 1, wherein the second antenna element is an antenna in which current can flow into the second board connected to the second antenna element.

4. The portable wireless apparatus according to claim 1, wherein, when the second housing is unfolded to be placed above the first housing, the first surface is used by being directed frontwardly, and wherein the first radiation electromagnetic field and the second radiation electromagnetic field are made to correspond to a vertically-polarized electromagnetic wave.

5. The portable wireless apparatus according to claim 4, wherein an operating portion are provided on the first surface of the first board.

6. The portable wireless apparatus according to claim 4, wherein the first feeding portion is provided in a vicinity of a corner portion of the first board, which is closer to the second housing, the second feeding portion is provided in a vicinity of a corner portion of the second board, which is closer to the first housing and is apart from the first feeding portion, the corner portion of the second board forms at least partly forms the side of the second board.

7. The portable wireless apparatus according to claim 6, wherein each of the first feeding portion and the second feeding portion is positioned at which a distance from a corner portion of each of the first board and the second board is set to be substantially from λ/6 to λ/4.

8. The portable wireless apparatus according to claim 1, comprising:

a connection member configured to connect a side of the first board, which is closer to the second housing, to a side of the second board, which is closer to the first housing, wherein the first feeding portion is provided in a vicinity of a corner portion of the first board, which is closer to the second housing, wherein, when the first antenna element is excited, high frequency current distribute along the side of the first board and the connection member, and the side of the second board, and wherein a component of the high frequency current along the side of the first board substantially cancels a component of the high frequency current distributing the side of the second board.

9. The portable wireless apparatus according to claim 8, wherein the corner portion of the first board at least partly forms the side of the first board.

10. the portable wireless apparatus according to claim 9, wherein the second feeding portion is provided in a vicinity of a corner portion of the second board, which is closer to the first housing and is apart from the first feeding portion, wherein the corner portion of the second board forms at least partly forms the side of the second board, wherein the corner portion of the first board is opposite to the corner portion of the second board with respect to the connection member.

11. The portable wireless apparatus according to claim 8, wherein the first board includes at least two longer sides and at least two shorter sides, wherein the side of the first board is included in at least two shorter sides, and wherein the first antenna element is substantially parallel to the side of the first board.

12. The portable wireless apparatus according to claim 11, wherein the connection member has a length of $$\left(\frac{1}{4}+n\right)\cdot\lambda$$

with respect to a direction orthogonal to the side of the first board, wheres λ is a wavelength of the high frequency currents, and n is an positive integer.

13. The portable wireless apparatus according to claim 8, wherein a first board has a first grounding circuit along the side thereof, wherein a second board has a second grounding circuit along the side thereof, and wherein the first grounding circuit is connected to the second grounding circuit through the connection member.

14. The portable wireless apparatus according to claim 8, wherein the connection member is axissymmetricaly arranged with respect to a center between the side of the first board and the side of the second board.

15. The portable wireless apparatus according to claim 1, further comprising:

a connection member configured to connect a side of the first board, which is closer to the second housing, to a side of the second board, which is closer to the first housing, wherein the first feeding portion is provided in a vicinity of a corner portion of the first board, which is closer to the second housing, wherein the second feeding portion is provided in a vicinity of a corner portion of the second board, which is closer to the first housing and is apart from the first feeding portion, wherein, when the first antenna element or the second antenna element is excited, a high frequency current distributes along the side of the first board, the connection member, and the side of the second board, and wherein a component of the high frequency current along the side of the first board substantially cancels a component of the high frequency current distributing along the side of the second board.

16. The portable wireless apparatus according to claim 15, wherein the corner portion of the first board at least partly forms the side of the first board, wherein the corner portion of the second board at least partly forms the side of the second board, and wherein the corner portion of the first board is opposite to the corner portion of the second board with respect to the connection member.

17. The portable wireless apparatus according to claim 15, wherein the first board includes at least two longer sides and at least two shorter sides, wherein the side of the first board is included in at least two shorter sides, and wherein the first antenna element is substantially parallel to the side of the first board.

18. The portable wireless apparatus according to claim 15, wherein a first board has a first grounding circuit along the side thereof, wherein a second board has a second grounding circuit along the side thereof, and wherein the first grounding circuit is connected to the second grounding circuit through the connection member.

19. The portable wireless apparatus according to claim 1, wherein the first board includes at least two longer sides and two shorter sides, and wherein the first antenna element is substantially perpendicular to one side of the two longer sides.

20. The portable wireless apparatus according to claim 1, wherein the first board includes at least two longer sides and two shorter sides, and wherein the first antenna element is substantially parallel to one side of the two shorter sides.

* * * * *